(12) United States Patent
Kubota et al.

(10) Patent No.: US 11,683,431 B2
(45) Date of Patent: Jun. 20, 2023

(54) OPERATION MODE MANAGEMENT SYSTEM THAT SETS TIME FRAMES FOR VARIOUS MODES

(71) Applicant: FUJIFILM BUSINESS INNOVATION CORP., Tokyo (JP)

(72) Inventors: Kosuke Kubota, Kanagawa (JP); Daichi Takahashi, Kanagawa (JP); Masakazu Ketsuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 355 days.

(21) Appl. No.: 16/896,583

(22) Filed: Jun. 9, 2020

(65) Prior Publication Data

US 2021/0160396 A1 May 27, 2021

(30) Foreign Application Priority Data

Nov. 22, 2019 (JP) .............................. JP2019-211200

(51) Int. Cl.
*H04N 1/46* (2006.01)
*H04N 1/00* (2006.01)
(52) U.S. Cl.
CPC ..... *H04N 1/00954* (2013.01); *H04N 1/00204* (2013.01); *H04N 1/00411* (2013.01)

(58) Field of Classification Search
CPC .......... H04N 1/00954; H04N 1/00204; H04N 1/00411
USPC ...................... 358/1.13, 1.15; 399/43, 81, 85
See application file for complete search history.

(56) References Cited

U.S. PATENT DOCUMENTS

| 10,484,362 | B2 | 11/2019 | Kakii | |
|---|---|---|---|---|
| 2013/0222834 | A1* | 8/2013 | Hosoi | H04N 1/4433 358/1.13 |
| 2017/0308151 | A1* | 10/2017 | Zhang | G06F 3/1288 |

FOREIGN PATENT DOCUMENTS

| JP | 2016-12774 A | 1/2016 |
|---|---|---|
| JP | 2017-102503 A | 6/2017 |

* cited by examiner

*Primary Examiner* — Jamares Q Washington
(74) *Attorney, Agent, or Firm* — Oliff PLC

(57) ABSTRACT

An information processing apparatus includes a memory and a processor configured to change an operation mode between a first operation mode and a second operation mode depending on preset time frames, set the time frames in response to an operation performed via a network by an administrative user having administration authority, and change a current operation mode to the first operation mode or the second operation mode in response to an operation input by a general user on an operation panel of the information processing apparatus.

10 Claims, 22 Drawing Sheets

FIG. 22
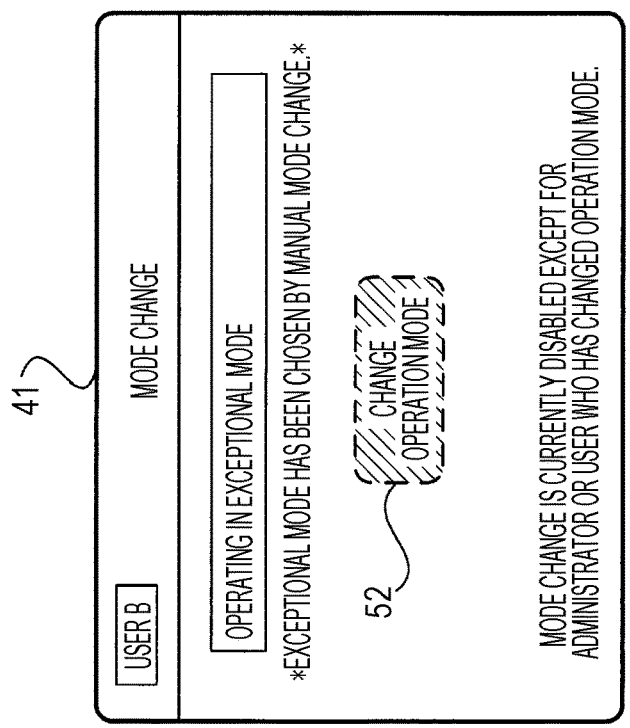
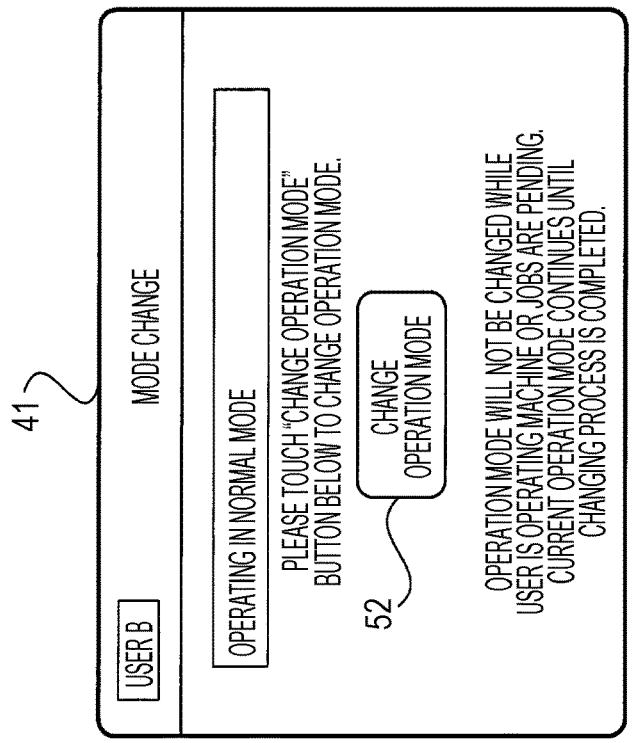

OPERATION MODE MANAGEMENT SYSTEM THAT SETS TIME FRAMES FOR VARIOUS MODES

CROSS-REFERENCE TO RELATED APPLICATIONS

This application is based on and claims priority under 35 USC 119 from Japanese Patent Application No. 2019-211200 filed Nov. 22, 2019.

BACKGROUND

(i) Technical Field

The present disclosure relates to an information processing apparatus and a non-transitory computer readable medium storing a program.

(ii) Related Art

Japanese Unexamined Patent Application Publication No. 2016-012774 discloses an image processing system in which an operation schedule of a multifunction peripheral is generated based on power information indicating how electric power is used and based on user's schedule information and power supply modes are switched based on the generated operation schedule.

Japanese Unexamined Patent Application Publication No. 2017-102503 discloses an information processing apparatus having a plurality of input interfaces and configured to set whether authentication is needed for each input interface.

SUMMARY

Aspects of non-limiting embodiments of the present disclosure relate to an information processing apparatus and a non-transitory computer readable medium storing a program, in which a general user having no administration authority may temporarily change an operation mode though an administrative user having administration authority has made settings so that the operation mode is changed depending on time frames.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a memory and a processor configured to change an operation mode between a first operation mode and a second operation mode depending on preset time frames, set the time frames in response to an operation performed via a network by an administrative user having administration authority, and change a current operation mode to the first operation mode or the second operation mode in response to an operation input by a general user on an operation panel of the information processing apparatus.

BRIEF DESCRIPTION OF THE DRAWINGS

An exemplary embodiment of the present disclosure will be described in detail based on the following figures, wherein:

FIG. 22 illustrates how the operation mode change button is enabled for the second general user after 9:00 on Monday.

DETAILED DESCRIPTION

An exemplary embodiment of the present disclosure is described in detail with reference to the drawings.

Figure 1:
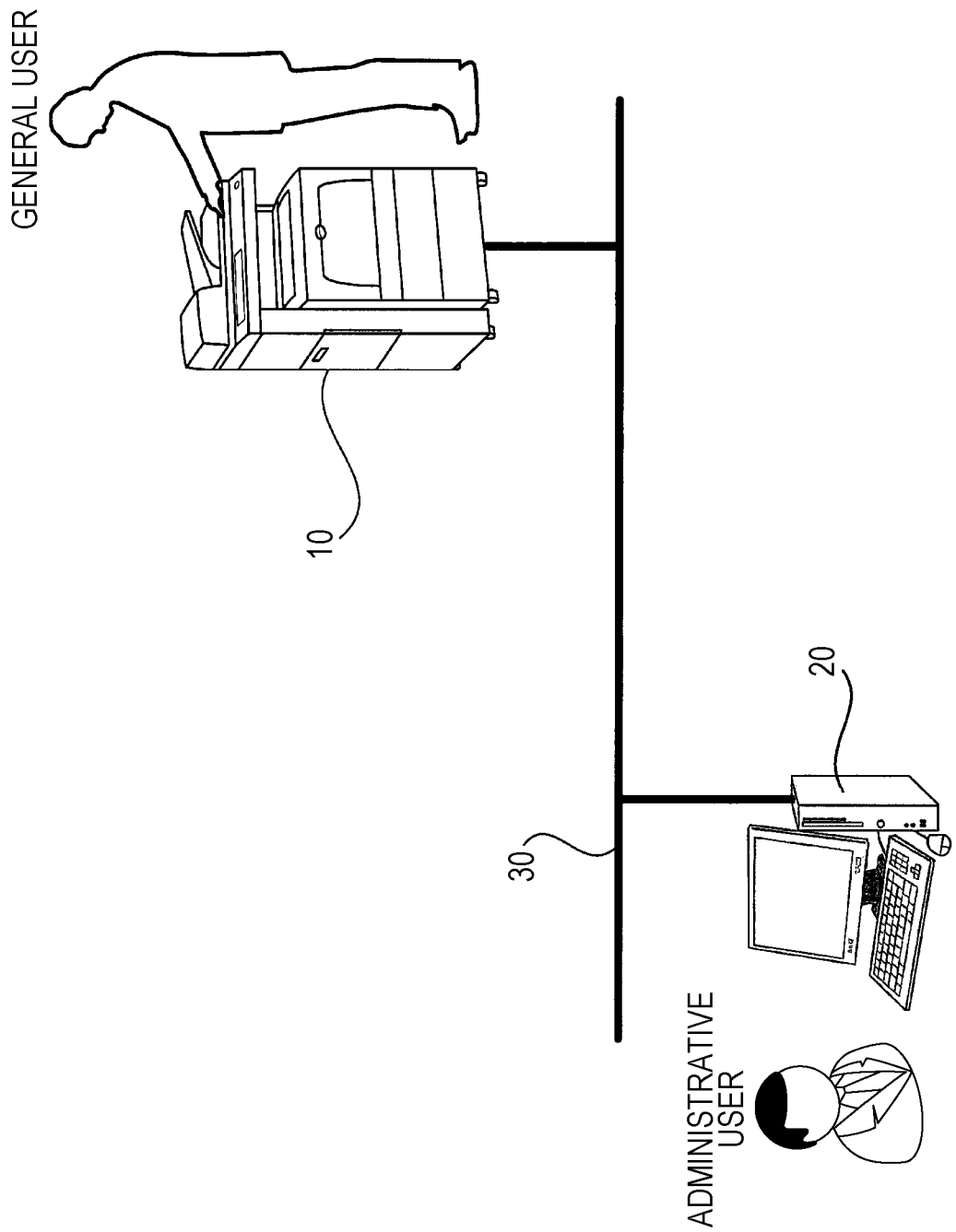
FIG. 1 illustrates the system configuration of an image forming system according to an exemplary embodiment of the present disclosure.

FIG. 1 illustrates the system configuration of an image forming system according to the exemplary embodiment of the present disclosure.

As illustrated in FIG. 1, the image forming system according to the exemplary embodiment of the present disclosure includes an image forming apparatus 10 and a terminal apparatus 20 connected together via a network 30. The image forming apparatus 10 is a so-called multifunction peripheral having a plurality of functions such as printing, scanning, copying, and facsimile functions.

The terminal apparatus 20 is operated by an administrative user having administration authority. The terminal apparatus 20 has a function of making various settings about, for example, operations of the image forming apparatus 10 by using a web user interface (UI). The web UI is a user interface using web browser software to display operation screens of the image forming apparatus 10 on a display of the terminal apparatus 20 so that settings may be made for the image forming apparatus 10. The web UI function is also called CentreWare Internet Services (CWIS).

The administration authority is authority to manage various settings about, for example, operations of the image forming apparatus 10. For example, one or two users may have the administration authority in an organization where the image forming apparatus 10 is used, and those users manage operations and settings of the image forming apparatus 10. Users having no administration authority are called general users. The administrative user vests the general users with only authority to use the image forming apparatus 10.

Any user who is going to use or operate the image forming apparatus 10 is authenticated to determine whether the user is a general or administrative user. The general user is allowed to operate the image forming apparatus 10 in a limited range compared with the administrative user.

This exemplary embodiment is directed to a case where the image forming apparatus 10 is scheduled to change its operation mode depending on preset time frames. Scheduling refers to settings of automatically changing the operation mode of the image forming apparatus 10 depending on preset time frames.

Scheduling of paperless faxing is described below as an example of the scheduling. In this exemplary embodiment, the image forming apparatus 10 is scheduled as illustrated in FIG. 2.

Figure 2:
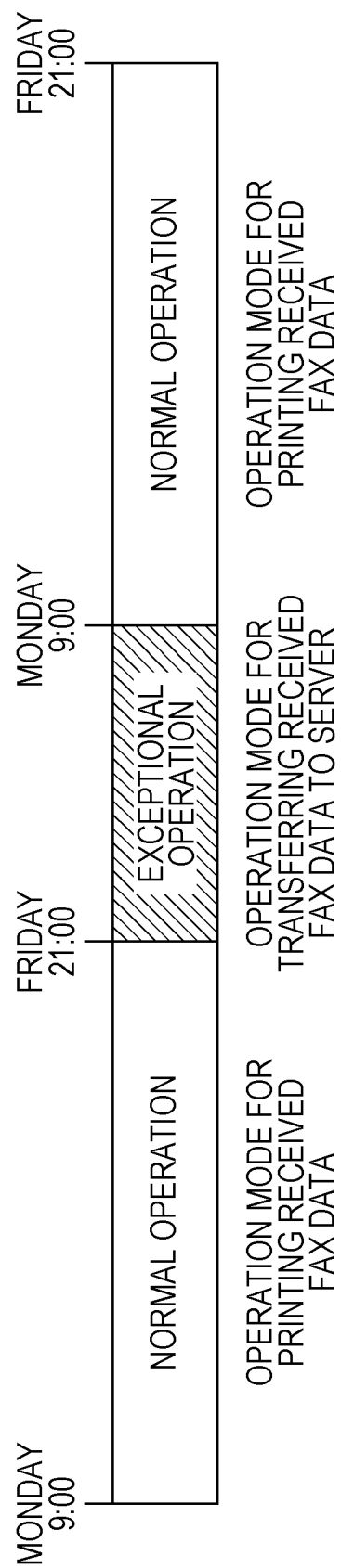
FIG. 2 illustrates an example of scheduling of paperless faxing.

In FIG. 2, the image forming apparatus 10 is scheduled to operate in an operation mode for printing received fax data on print paper in a time frame from 9:00 on Monday to 21:00 on Friday, and to operate in an operation mode for transferring received fax data to a preset server without printing the data on print paper in a time frame from 21:00 on Friday to 9:00 on Monday.

The operation of printing received fax data on print paper is referred to as a normal operation. The operation of transferring received fax data to a preset server without printing the data on print paper is referred to as an exceptional operation.

That is, the image forming apparatus 10 scheduled as described above performs the normal operation in the time frame from 9:00 on Monday to 21:00 on Friday and the exceptional operation at 21:00 on Friday by changing the operation mode. The image forming apparatus 10 changes the operation mode again at 9:00 on Monday to perform the normal operation.

The reason why the scheduling is made is as follows. If received fax data is printed on Saturday or Sunday, the printed paper is left for a long period and may be lost. On Saturday and Sunday when the office is closed, the received fax data is desirably stored in a server and printed collectively on Monday.

Figure 3:
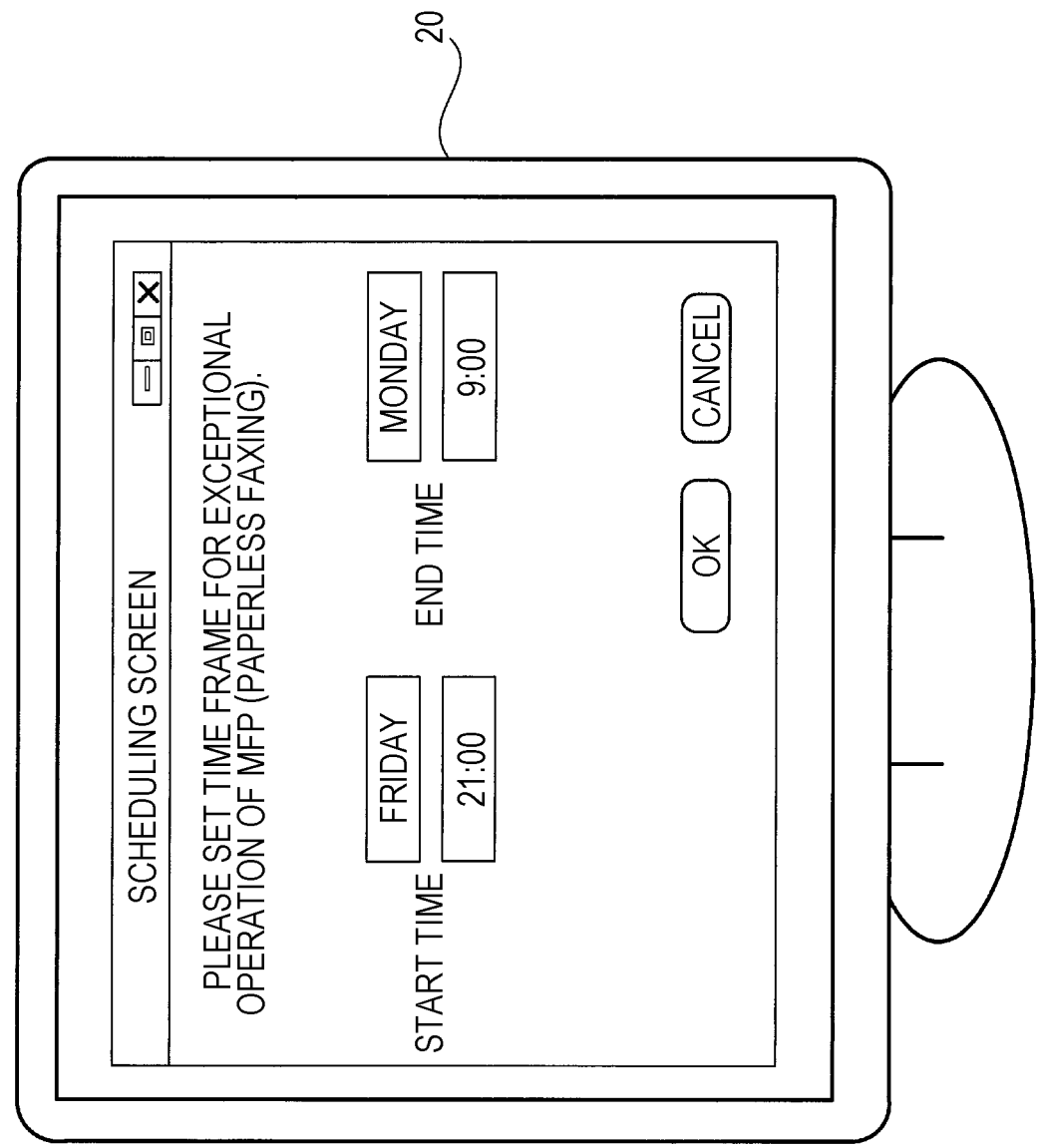
FIG. 3 illustrates an example of an operation screen to be used by an administrative user for scheduling using a web UI.

The scheduling may be made by the administrative user alone. FIG. 3 illustrates an example of an operation screen to be used by the administrative user for the scheduling using the web UI.

Referring to FIG. 3, the administrative user schedules the image forming apparatus 10 on the terminal apparatus 20 so that the image forming apparatus 10 performs paperless faxing as the exceptional operation in a time frame from 21:00 on Friday to 9:00 on Monday.

The image forming apparatus 10 scheduled by the administrative user changes its operation mode based on the schedule. Since the scheduling may be made by the administrative user alone, the administration authority is also required to change the schedule.

Even if the administrative user is absent, the general user is not allowed to change the operation mode of the image forming apparatus 10.

For example, it is assumed that the office will suddenly be closed at noon on Friday because a storm is coming.

Since the office will be closed at noon on Friday, the image forming apparatus 10 needs to perform the paperless faxing as the exceptional operation from Friday afternoon. However, the general user having no administration authority is not allowed to change the schedule even if the administrative user is absent.

In the image forming apparatus 10 of this exemplary embodiment having a configuration described below, the general user having no administration authority may temporarily change the operation mode though the image forming apparatus 10 is scheduled to change the operation mode depending on time frames.

Figure 4:
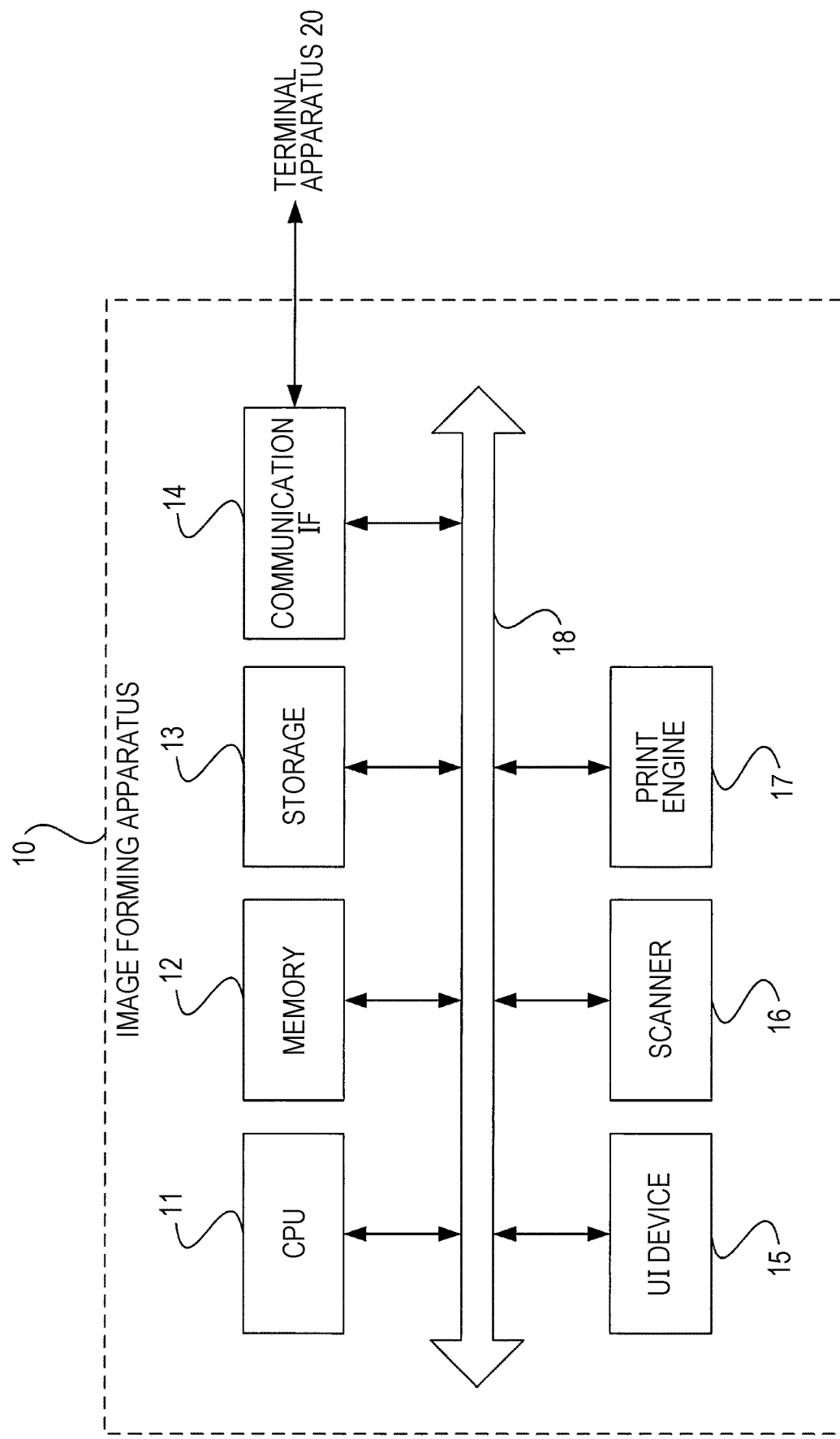
FIG. 4 is a block diagram illustrating the hardware configuration of an image forming apparatus according to the exemplary embodiment of the present disclosure.

FIG. 4 illustrates the hardware configuration of the image forming apparatus 10 in the image forming system of this exemplary embodiment.

As illustrated in FIG. 4, the image forming apparatus 10 includes a CPU 11, a memory 12, a storage 13 such as a hard disk drive, a communication interface (IF) 14 that transmits data to and receives data from an external apparatus or the like via the network 30, a user interface (UI) device 15 including a touch panel or a combination of a liquid crystal display and a keyboard, a scanner 16, and a print engine 17. Those components are connected together via a control bus 18.

The print engine 17 prints images on recording media such as print paper through a process of, for example, charging, exposing, developing, transferring, and fixing.

The CPU 11 is a processor that controls the operation of the image forming apparatus 10 by performing a predetermined process based on a control program stored in the memory 12 or the storage 13. In this exemplary embodiment, the CPU 11 reads and executes the control program stored in the memory 12 or the storage 13 but the program may be provided to the CPU 11 by being stored in a storage medium such as a CD-ROM.

Figure 5:
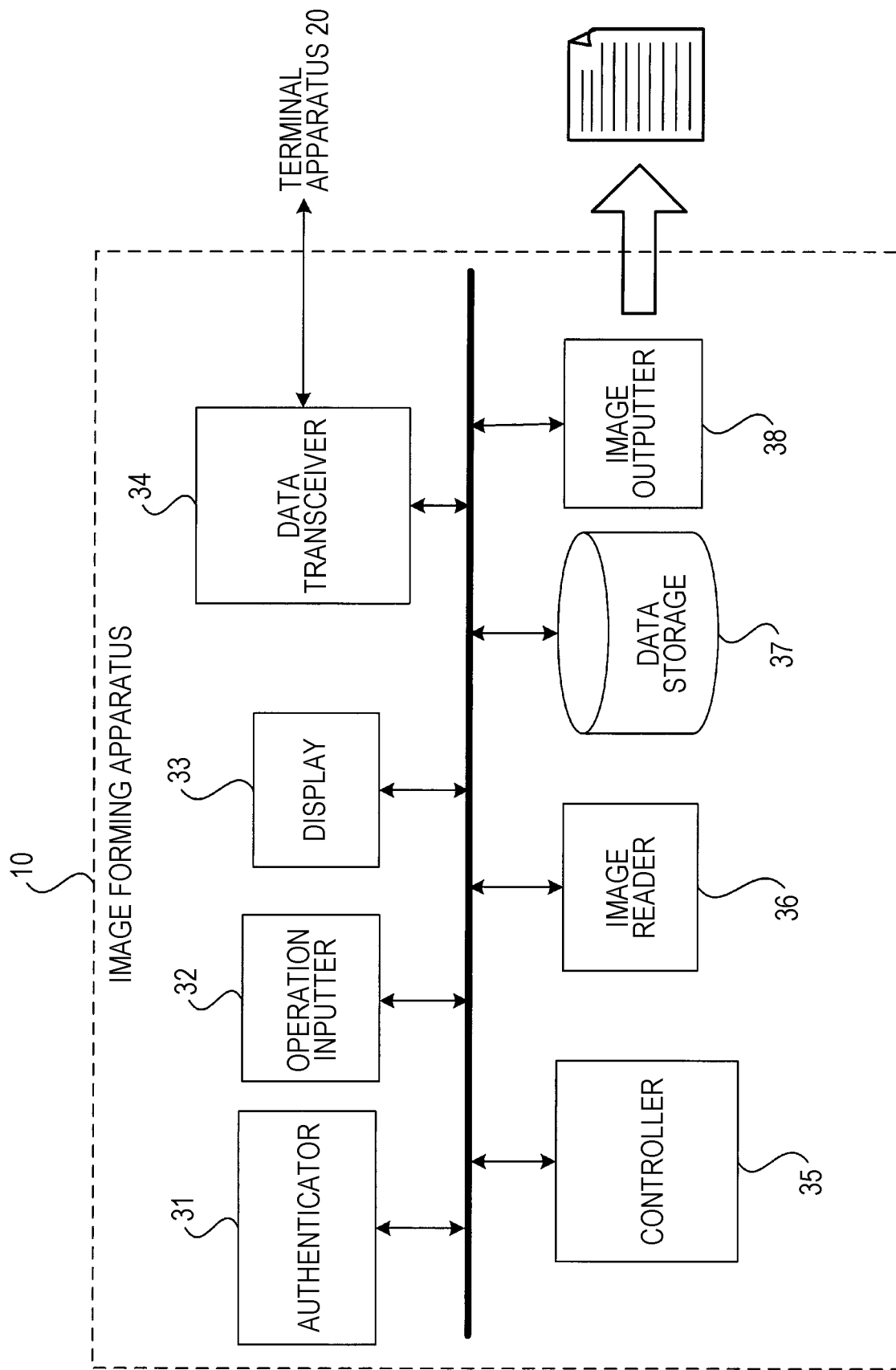
FIG. 5 is a block diagram illustrating the functional configuration of the image forming apparatus according to the exemplary embodiment of the present disclosure.

FIG. 5 is a block diagram illustrating the functional configuration of the image forming apparatus 10 that is implemented by executing the control program.

As illustrated in FIG. 5, the image forming apparatus 10 of this exemplary embodiment includes an authenticator 31, an operation inputter 32, a display 33, a data transceiver 34, a controller 35, an image reader 36, a data storage 37, and an image outputter 38.

The authenticator 31 authenticates a user who is going to operate the image forming apparatus 10. Through the authentication by the authenticator 31, the user of the image forming apparatus 10 is identified as a general or administrative user.

The data transceiver 34 transmits data to and receives data from the terminal apparatus 20 via the network 30.

The controller 35 controls the overall operation of the image forming apparatus 10. The controller 35 controls the image reader 36 to read a document image and store obtained image data in the data storage 37. The controller 35 controls the image outputter 38 to output an image onto a recording medium such as print paper. Although illustration is omitted in FIG. 5, the image forming apparatus 10 includes a fax transceiver and the controller 35 controls the fax transceiver to transmit and receive fax data via telephone lines.

The display 33 is controlled by the controller 35 to display various types of information for users. The operation inputter 32 inputs information on various users' operations. In this exemplary embodiment, a touch panel is used as an operation panel and therefore the display 33 and the operation inputter 32 constitute the operation panel.

The controller 35 manages operation modes of various functions of the image forming apparatus 10. The controller 35 changes the operation mode between a first operation mode and a second operation mode depending on preset time frames.

In the following description, scheduling of the paperless faxing is made as an example of the mode change.

That is, the controller 35 performs control for switching a normal mode for printing received fax data on print paper and an exceptional mode for transferring received fax data to a preset server without printing the data on print paper.

Only the administrative user having the administration authority may set the time frames in the schedule. Therefore, the controller 35 sets the time frames in the schedule in response to an operation performed by the administrative user via the network 30.

The controller 35 changes a current operation mode to the normal mode or the exceptional mode in response to an operation input by a general user on the operation panel of the image forming apparatus 10. If the current operation mode is the normal mode, the controller 35 changes the operation mode to the exceptional mode in response to an operation input by the general user on the operation panel. If the current operation mode is the exceptional mode, the controller 35 changes the operation mode to the normal mode in response to an operation input by the general user on the operation panel.

The normal mode is an operation mode in which the apparatus operates during a majority of its operating period. The exceptional mode is an operation mode in which the apparatus performs an operation different from that in the normal mode.

The controller 35 may accept the general user to input, via the operation panel, only the operation of changing the normal mode to the exceptional mode. The controller 35 may conversely accept the general user to input, via the operation panel, only the operation of changing the exceptional mode to the normal mode.

If the normal mode has been changed to the exceptional mode in response to the operation input by the general user on the operation panel, the controller 35 changes the operation mode from the exceptional mode to the normal mode at a timing to change the exceptional mode to the normal mode depending on the preset time frames.

If the normal mode has been changed to the exceptional mode in response to the operation input by the general user on the operation panel, the controller 35 may continue the exceptional mode irrespective of the timing to change the exceptional mode to the normal mode depending on the preset time frames.

In this case, the controller 35 may send information about the continuation of the exceptional mode to the general user who has changed the mode and/or the administrative user at a timing earlier by a preset period, for example, 5 minutes than the timing to change the exceptional mode to the normal mode depending on the preset time frames.

If the normal mode has been changed to the exceptional mode in response to the operation input by the general user on the operation panel, the controller 35 may perform operations in the normal mode and the exceptional mode in parallel at the timing to change the exceptional mode to the normal mode depending on the preset time frames. This control may be performed only if the operations in the normal mode and the exceptional mode may be performed in parallel.

The controller 35 may receive, in response to an operation input by the general user on the operation panel of the image forming apparatus 10, a period during which or a time until which the normal mode to be changed from the current operation mode is expected to continue, and may continue the normal mode until the received period elapses or the received time is reached.

If a current operation mode differs from an operation mode to be changed depending on the preset time frames, the controller 35 may display, on the operation panel, information indicating that the image forming apparatus 10 is operating in the operation mode changed in response to the operation input on the operation panel.

If the normal mode has been changed to the exceptional mode in response to an operation input by a first general user on the operation panel, the controller 35 rejects an operation of changing the operation mode by a second general user.

That is, if the normal mode has been changed to the exceptional mode in response to the operation input by the first general user on the operation panel, the controller 35 accepts the first general user or the administrative user to input a further operation to change the operation mode.

If the normal mode has been changed to the exceptional mode in response to the operation input by the first general user on the operation panel, the controller 35 may accept the second general user to input the operation of changing the operation mode after the timing to change the exceptional mode to the normal mode depending on the preset time frames.

Next, the operations of the image forming apparatus 10 of this exemplary embodiment are described in detail with reference to the drawings.

Figure 6:
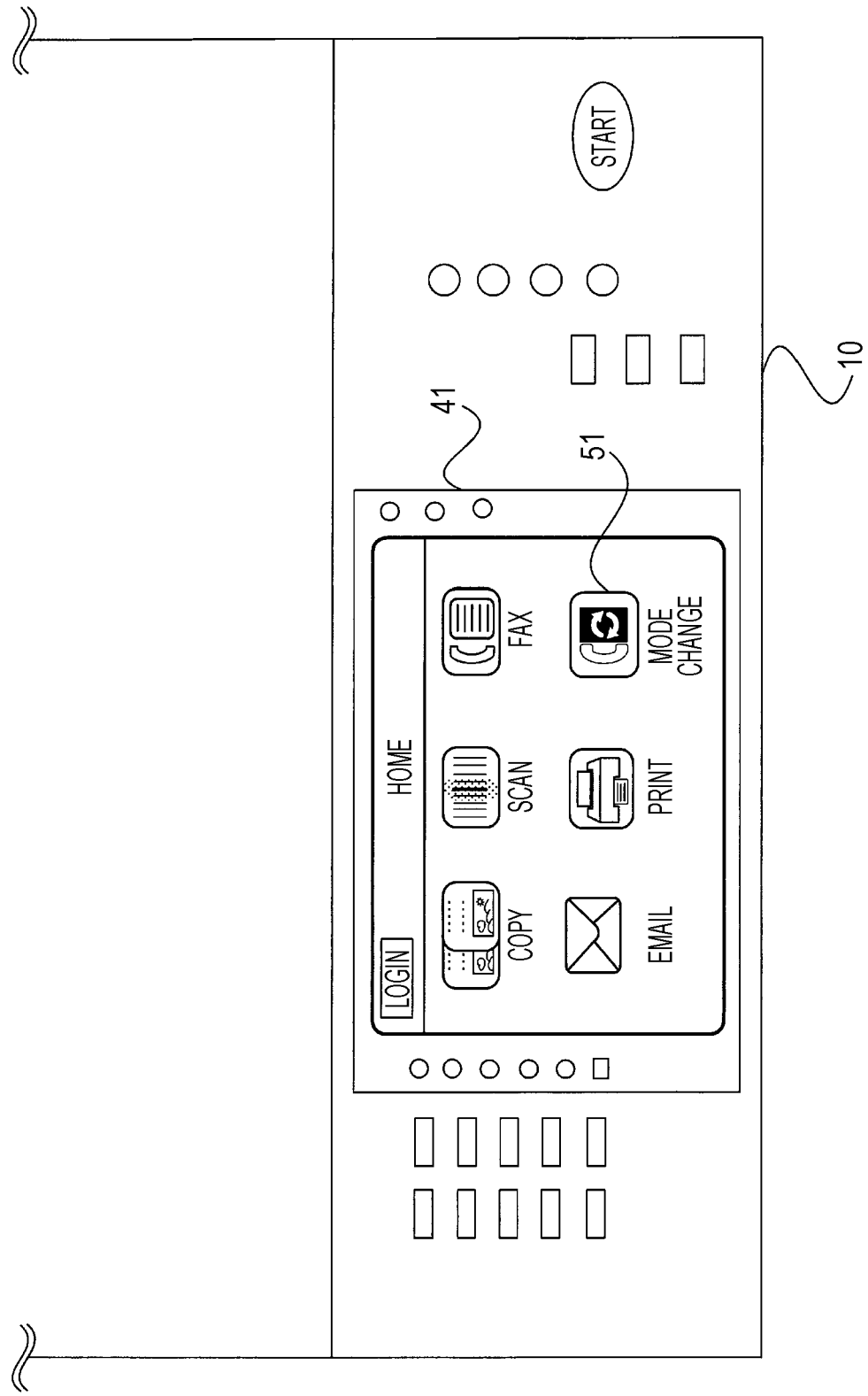
FIG. 6 illustrates an example of display contents on an operation panel of the image forming apparatus according to the exemplary embodiment of the present disclosure.

FIG. 6 illustrates an example of display contents on an operation panel 41 of the image forming apparatus 10 of this exemplary embodiment. The operation panel 41 is a so-called touch panel having functions of both the display 33 and the operation inputter 32.

Figure 7:
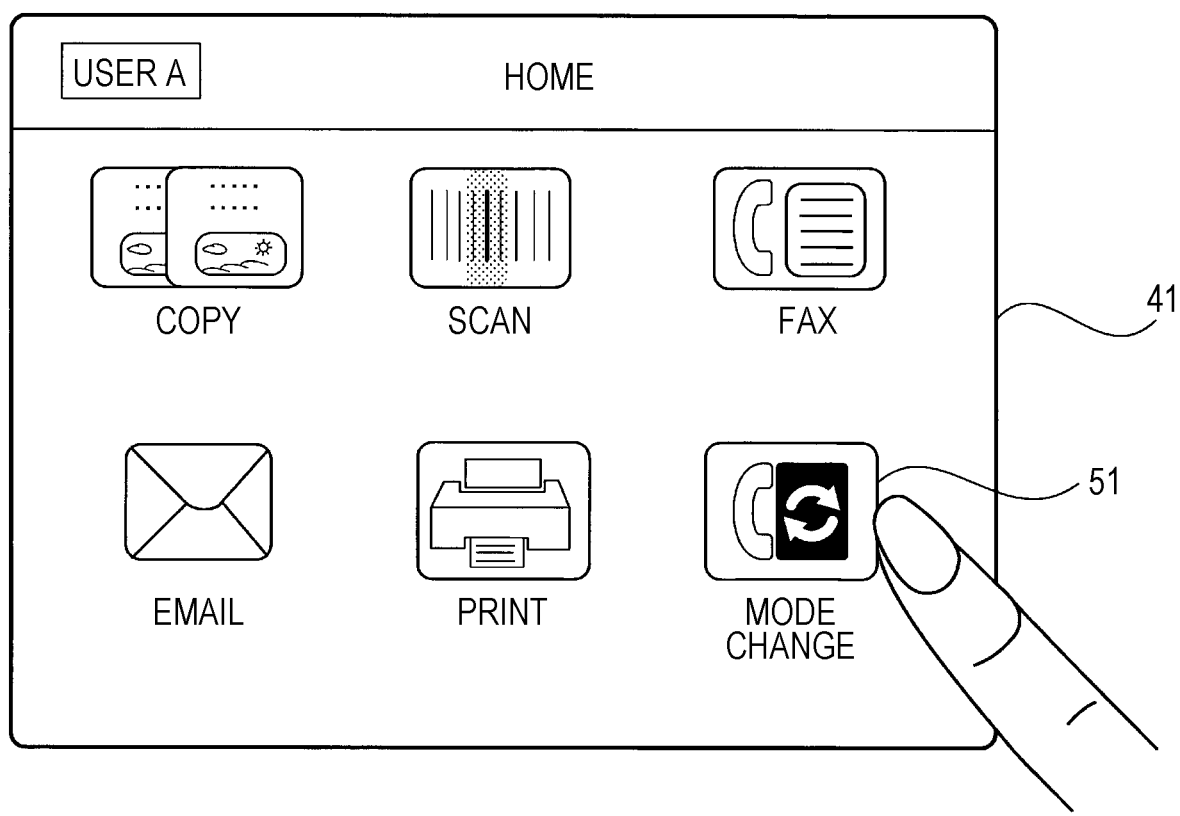
FIG. 7 is an enlarged view of the display contents on the operation screen illustrated in FIG. 6.

In FIG. 6, an operation screen in a standby state of the image forming apparatus 10 is displayed on the operation panel 41. Referring to FIG. 6, an icon 51 is displayed on the operation panel 41. General users may touch the icon 51 to choose the paperless faxing. FIG. 7 is an enlarged view of the display contents on the operation screen.

In the example of the operation screen illustrated in FIG. 7, a general user A touches the icon 51 to change the operation to the paperless faxing.

Figure 8:
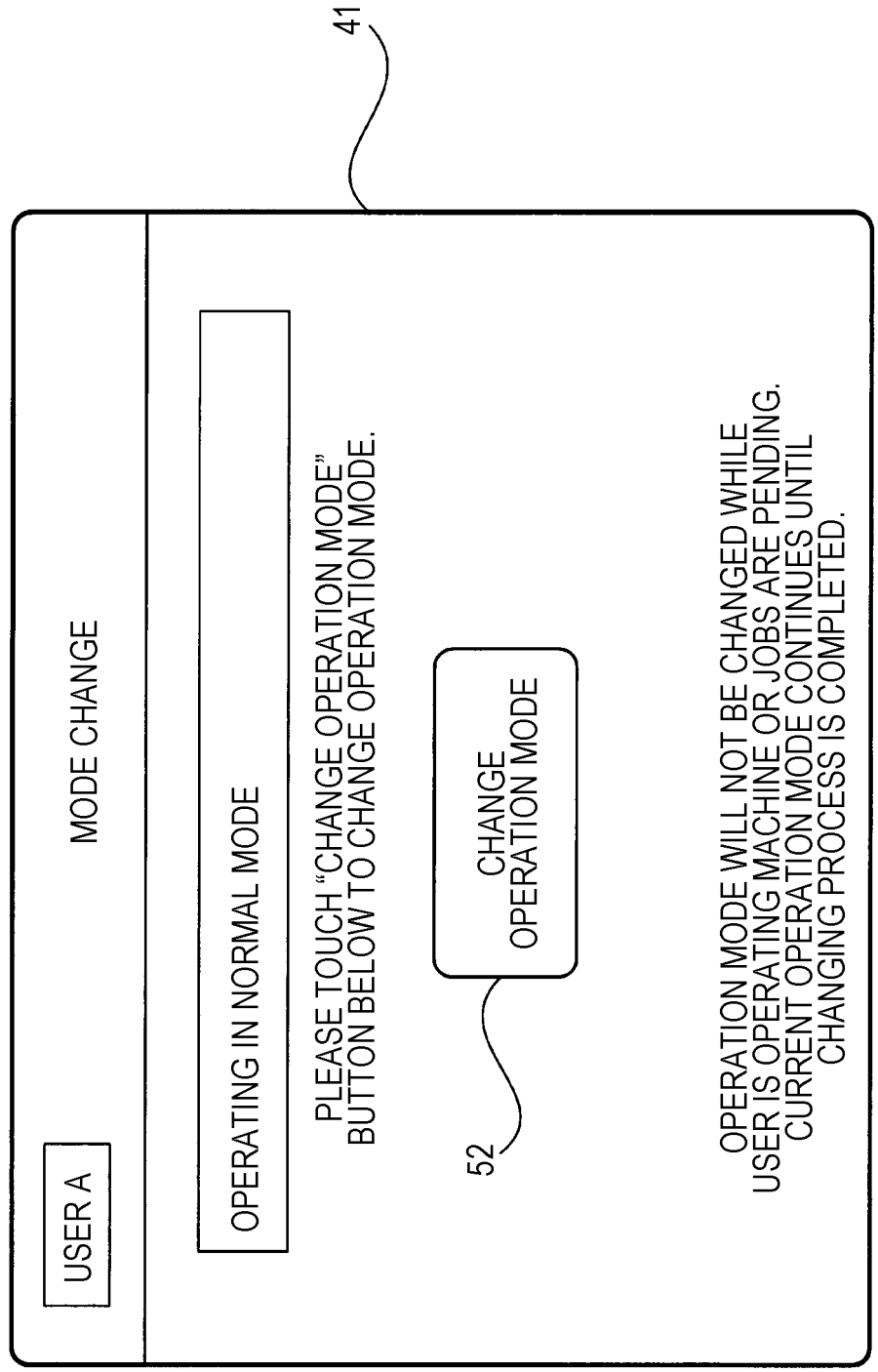
FIG. 8 illustrates an example of an operation screen to be displayed when a first general user touches an icon on the operation screen.

FIG. 8 illustrates an example of an operation screen to be displayed when the user A touches the icon 51 on the operation screen. In the example of the operation screen illustrated in FIG. 8, a current operation mode is the normal mode and an operation mode change button 52 is displayed. The operation mode change button 52 is used for changing the operation mode to the paperless faxing mode.

Figure 9:
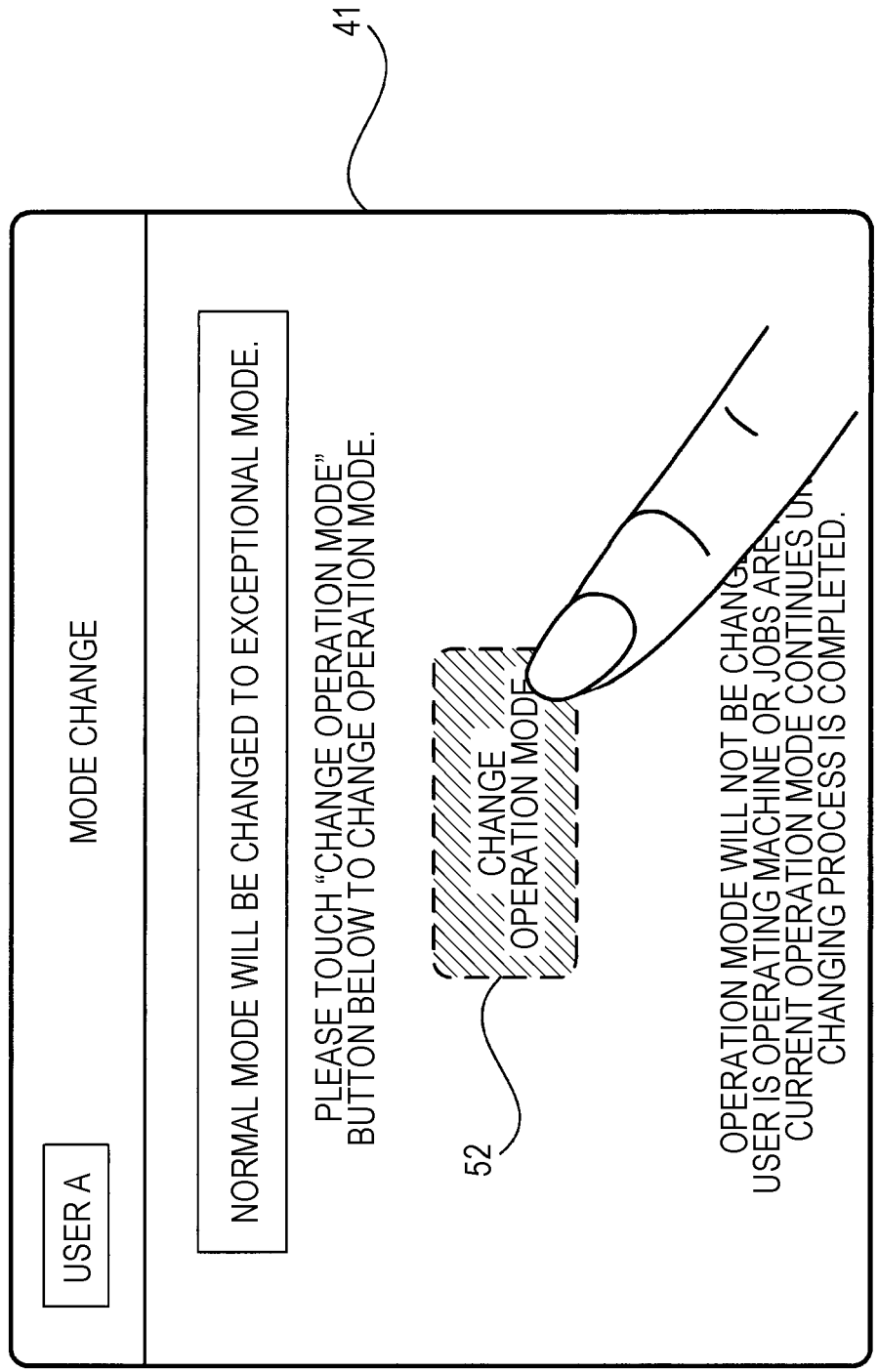
FIG. 9 illustrates an example of a display screen when the first general user changes a mode by touching an operation mode change button.

FIG. 9 illustrates an example of a display screen when the user A changes the mode by touching the operation mode change button 52. In the example of the display screen illustrated in FIG. 9, the user A touches the operation mode change button 52 and a message "Normal mode will be changed to exceptional mode." is displayed to notify the user A that the operation mode is going to be changed from the normal mode to the exceptional mode.

Figure 10:
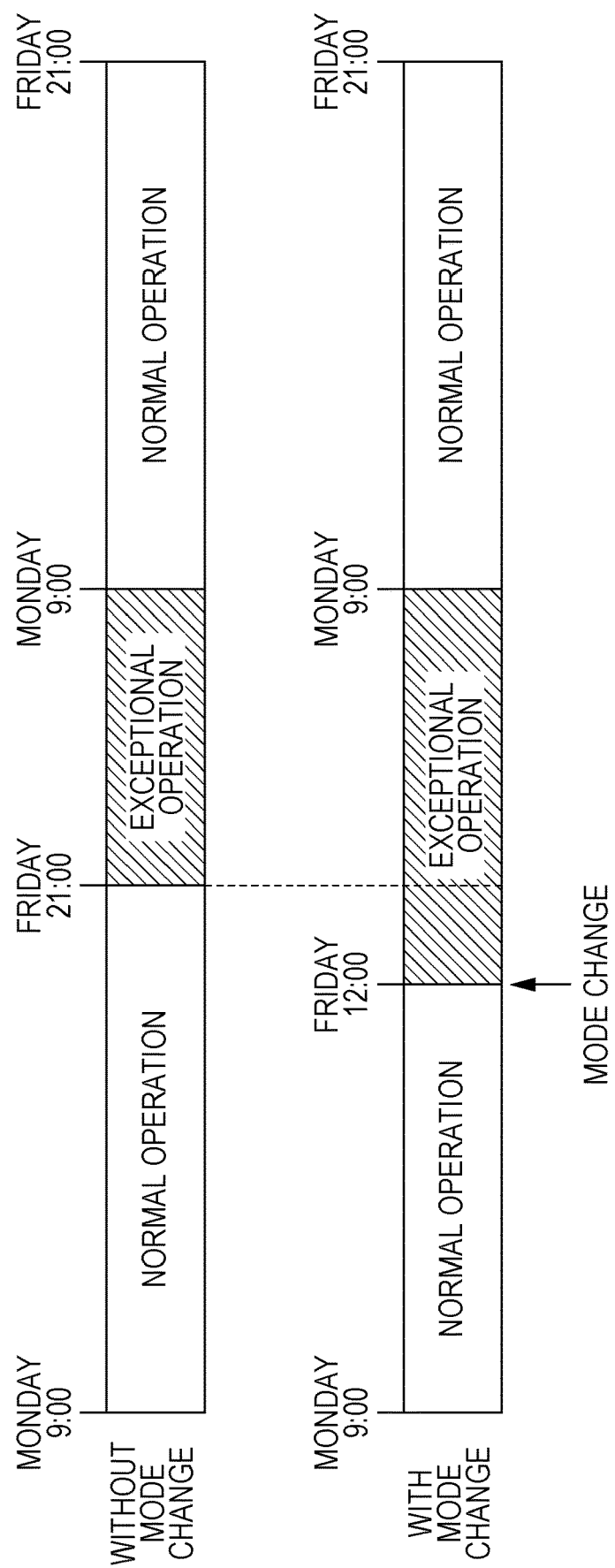
FIG. 10 illustrates an example of how the image forming apparatus operates when the mode is changed at 12:00 on Friday.

FIG. 10 illustrates transition of the operation of the image forming apparatus 10 when the mode is changed, for example, at 12:00 on Friday. FIG. 10 illustrates, in its upper part, transition of the operation without the mode change, that is, transition of the operation on schedule. FIG. 10 illustrates, in its lower part, transition of the operation when the user A has manually changed the mode.

The manual mode change means that the operation mode is changed in response to the general user or the administrative user operating the operation mode change button 52 displayed on the operation panel 41.

In FIG. 10, the general user changes the operation mode from the normal mode to the exceptional mode at 12:00 on Friday and the exceptional mode continues. The exceptional mode is changed to the normal mode at 9:00 on Monday.

In the example of the transition of the operation in FIG. 10, when the normal mode has been changed to the exceptional mode in response to the operation input by the general user on the operation panel, the controller 35 changes the operation mode from the exceptional mode to the normal mode at the timing to change the exceptional mode to the normal mode depending on the preset time frames.

That is, even though the general user has changed the operation mode, the operation undergoes transition on schedule at the scheduled timing to change the exceptional mode to the normal mode.

When the normal mode has been changed to the exceptional mode in response to the operation input by the general user on the operation panel, the controller 35 may continue the exceptional mode irrespective of the timing to change the exceptional mode to the normal mode depending on the preset time frames.

Figure 11:
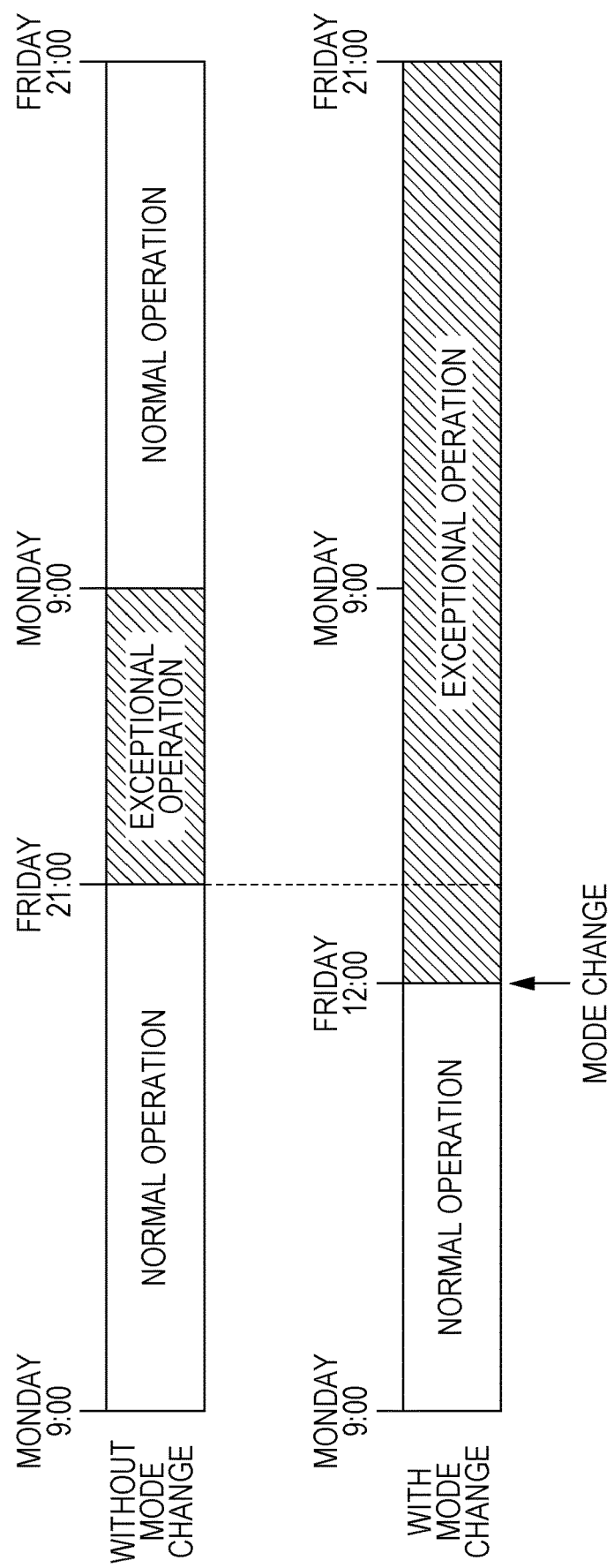
FIG. 11 illustrates another example of how the image forming apparatus operates when the mode is changed at 12:00 on Friday.

FIG. 11 illustrates an example of transition of the operation in this case. In FIG. 11, the general user changes the operation mode from the normal mode to the exceptional mode at 12:00 on Friday and the exceptional mode continues. The exceptional mode also continues after 9:00 on Monday.

In the operation example illustrated in FIG. 11, the operation mode has manually been changed with some intention. Therefore, priority is given to the manual mode change over the schedule.

In response to the manual mode change, the image forming apparatus 10 operates in an operation mode different from the scheduled operation mode.

Figure 12:
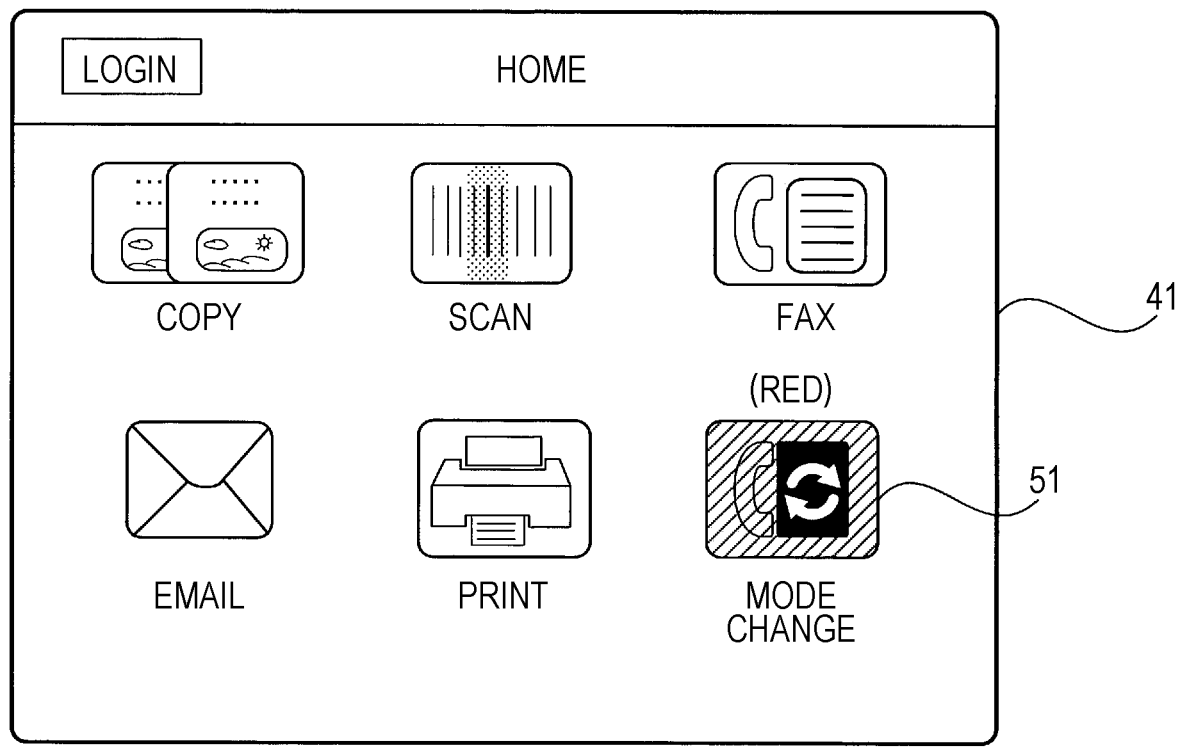
FIG. 12 illustrates a display example on the operation panel indicating that the image forming apparatus is operating in a manually changed operation mode.
Figure 13:
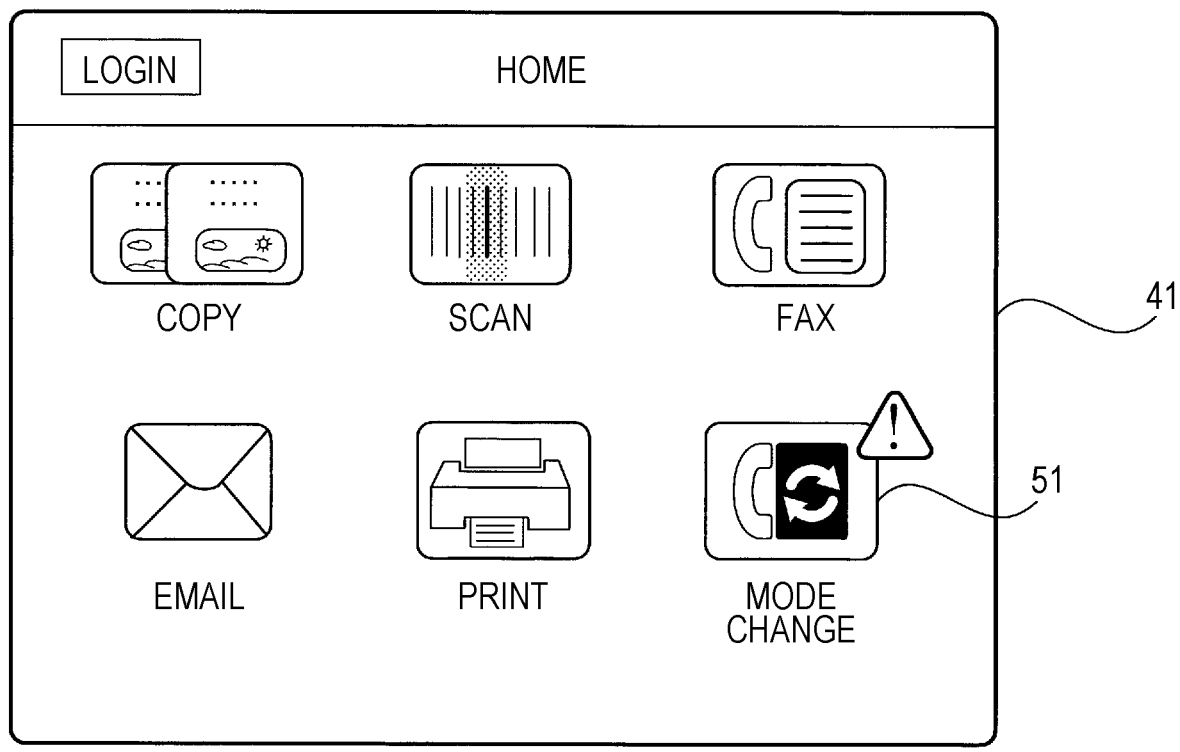
FIG. 13 illustrates another display example on the operation panel indicating that the image forming apparatus is operating in a manually changed operation mode.

If the current operation mode differs from the scheduled operation mode, the controller 35 may display, on the operation panel 41, information indicating that the image forming apparatus 10 is operating in the operation mode manually changed on the operation panel 41. FIG. 12 and FIG. 13 illustrate display examples on the operation panel 41 in this case.

In the display example illustrated in FIG. 12, the icon 51 to be used for choosing the paperless faxing has a color (e.g., red) different from the normal color to indicate that the image forming apparatus 10 is operating in the exceptional mode though the image forming apparatus 10 is scheduled to operate in the normal mode.

In the display example illustrated in FIG. 13, the icon 51 to be used for choosing the paperless faxing has a different shape including an alert mark to indicate that the image forming apparatus 10 is operating in the exceptional mode though the image forming apparatus 10 is scheduled to operate in the normal mode.

If the operation undergoes transition as illustrated in FIG. 11, the exceptional mode continues even after 9:00 on Monday. If the user who changed the operation mode at 12:00 on Friday forgets the mode change, the exceptional operation may continue unintendedly or the continuation of the exceptional mode may cause a problem for some reason.

Figure 14:
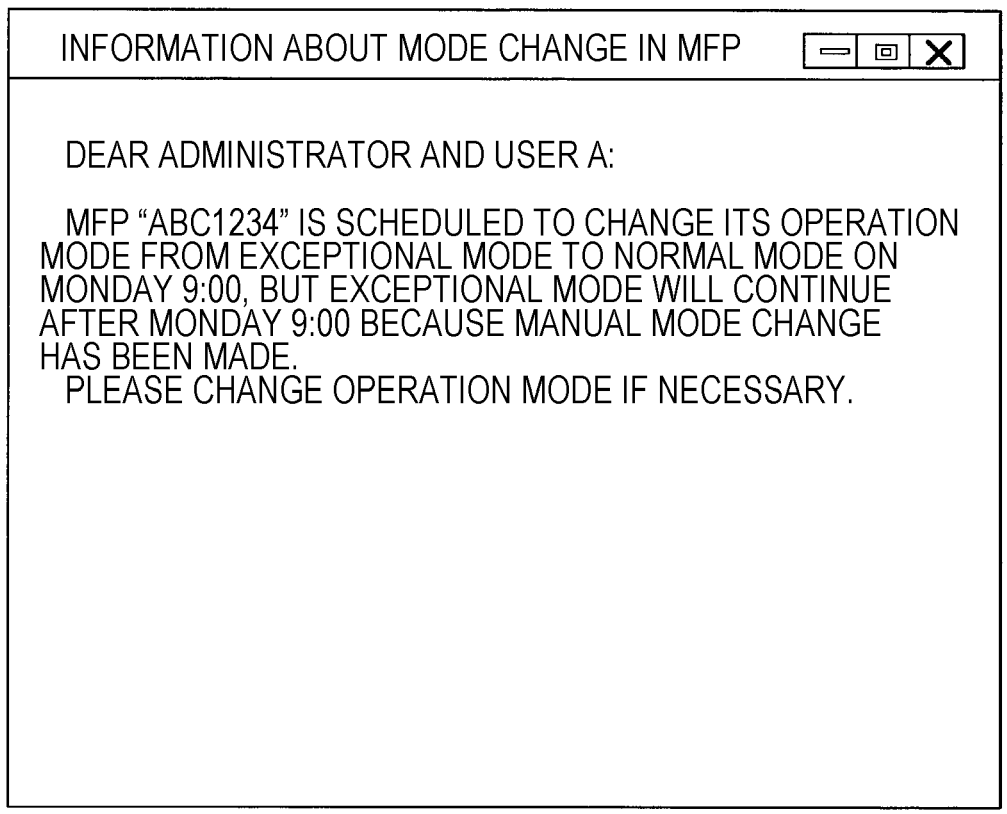
FIG. 14 illustrates an example of information about continuation of an exceptional mode, which is sent to the administrative user and the first general user who has changed the mode.

Therefore, the administrative user and the user A who has changed the mode may be notified of information about the continuation of the exceptional mode by electronic mail or the like at a timing slightly earlier, for example, earlier by 5 minutes than 9:00 on Monday when the exceptional mode is scheduled to be changed to the normal mode. FIG. 14 illustrates an example of the information in this case.

Figure 15:
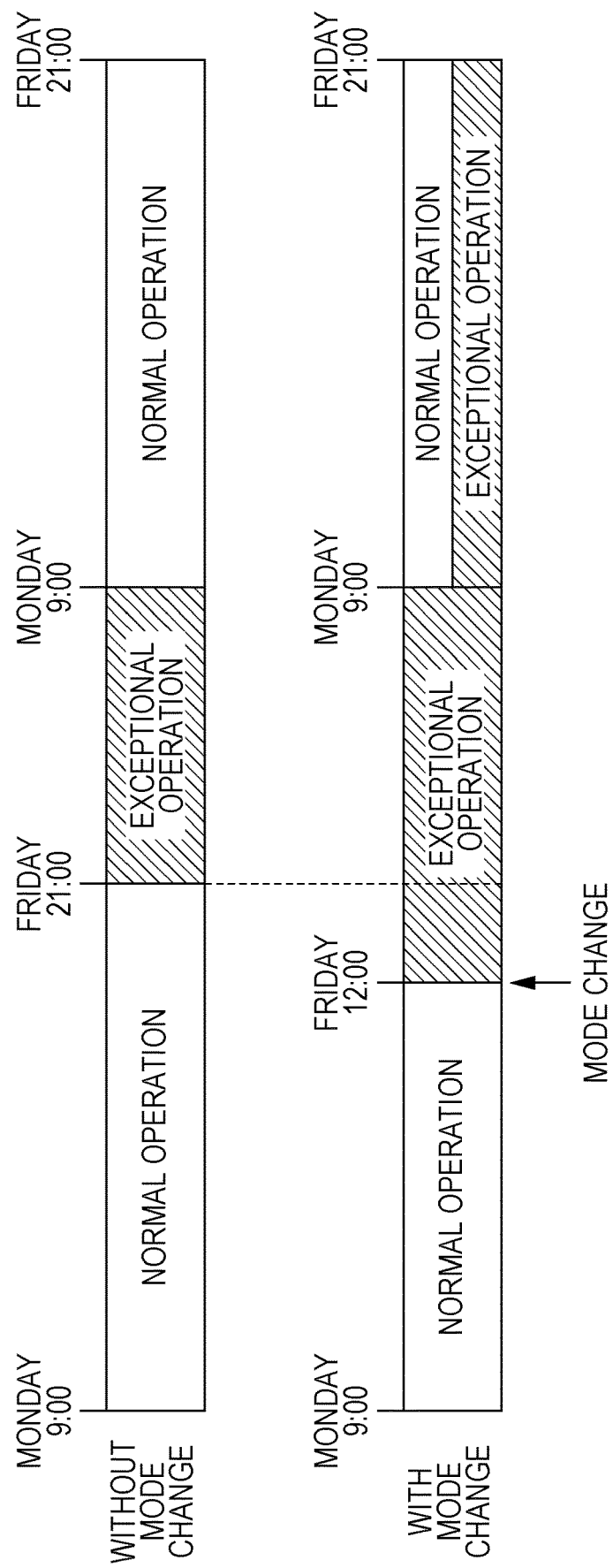
FIG. 15 illustrates still another example of how the image forming apparatus operates when the operation mode is manually changed at 12:00 on Friday.

FIG. 15 illustrates another example of the transition of the operation when the operation mode is manually changed at 12:00 on Friday.

In FIG. 15, the operations in the normal mode and the exceptional mode are performed in parallel after 9:00 on Monday. That is, in the operation example illustrated in FIG. 15, both the operation of printing received fax data on print paper and the operation of transferring received fax data to a preset server are performed after 9:00 on Monday.

In the operation examples described above, the general user only changes the operation mode by touching the operation mode change button 52. The operation mode may be changed in detail.

Figure 16:
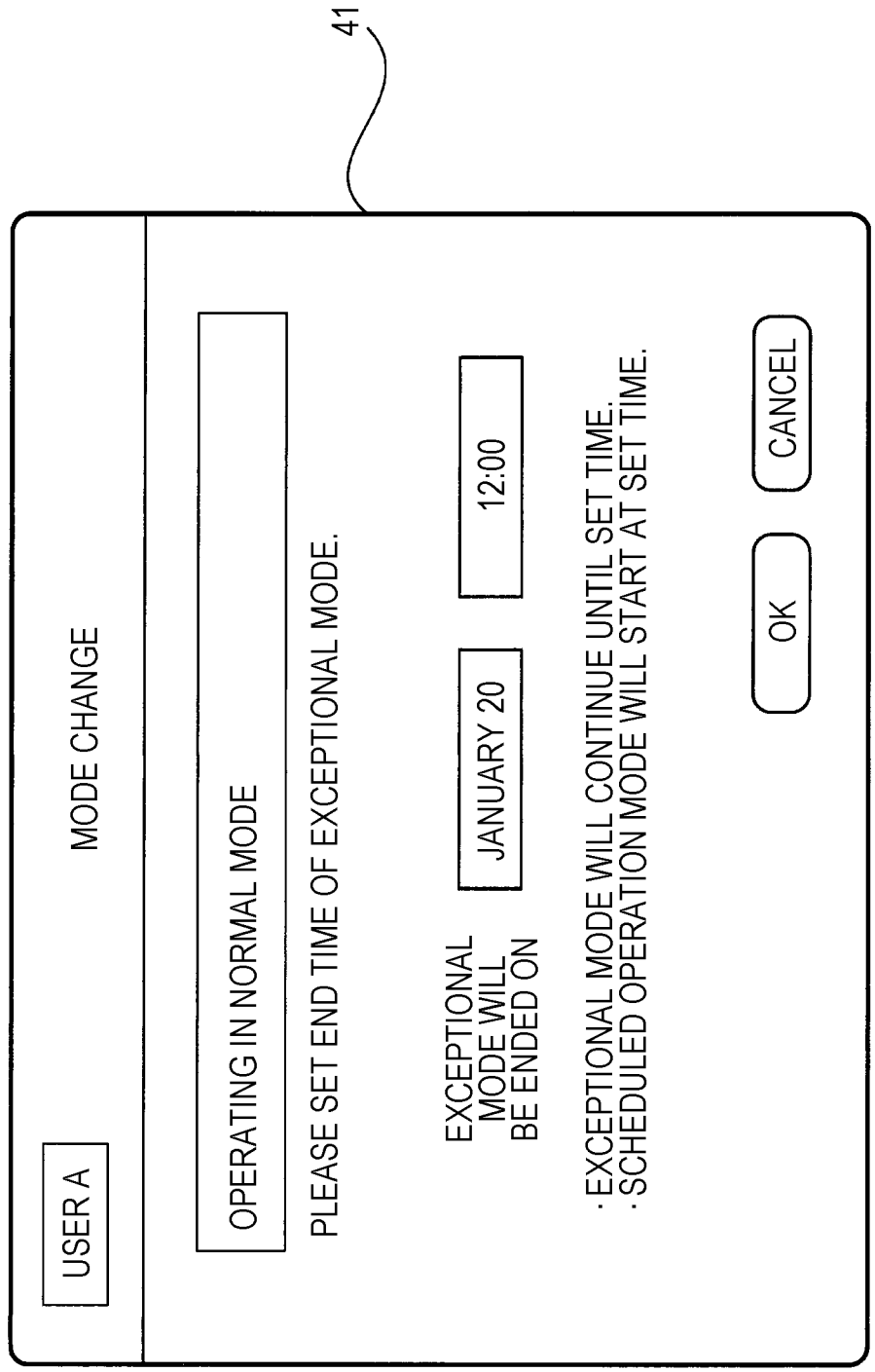
FIG. 16 illustrates an example of an operation screen on which an end time of the exceptional mode may be set to determine a period of the exceptional operation.

FIG. 16 illustrates an example of an operation screen on which an end time of the exceptional mode may be set to determine a period of the exceptional operation. Referring to FIG. 16, "12:00 on January 20" is set as the end time of the exceptional mode.

Figure 17:
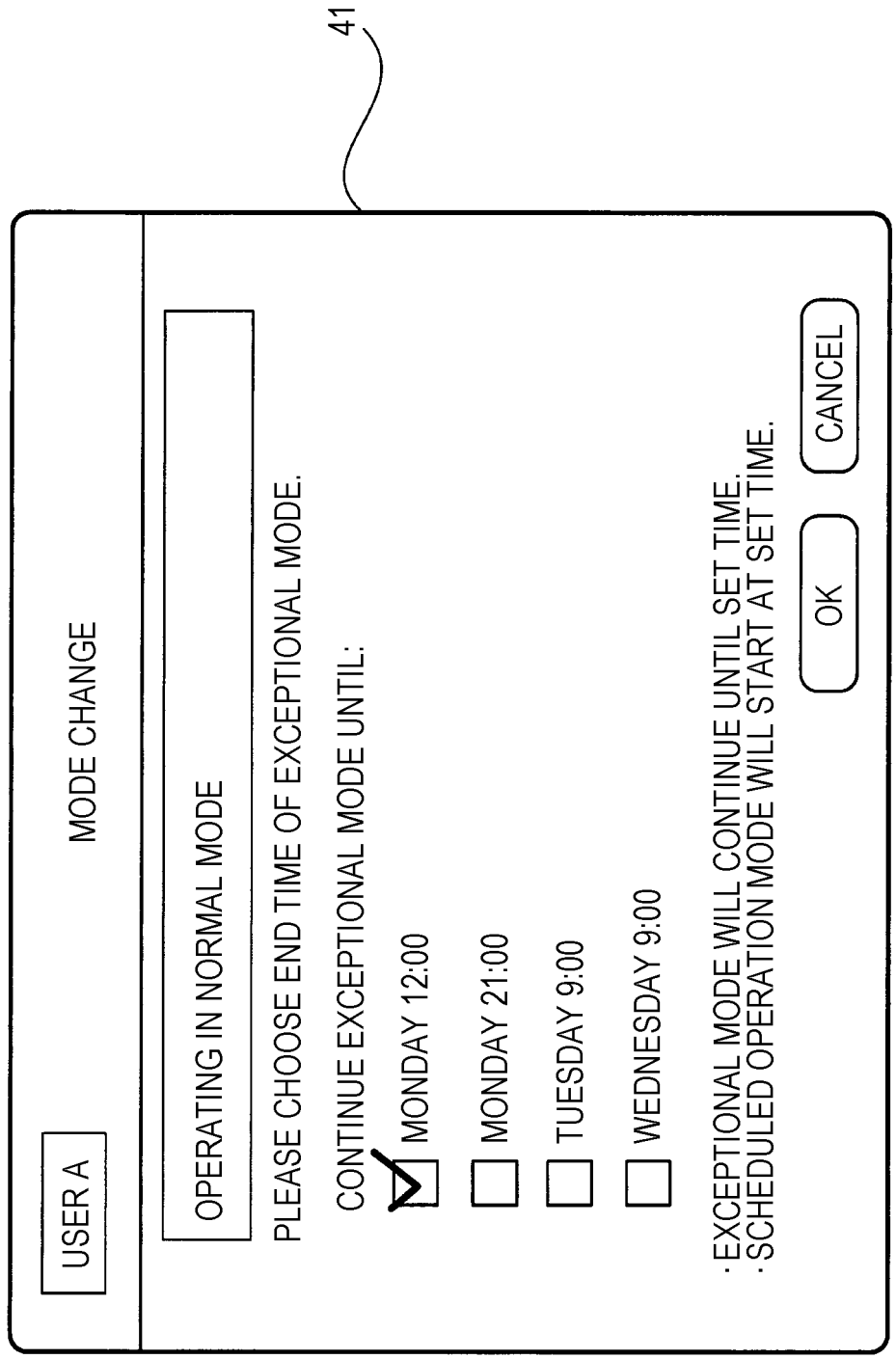
FIG. 17 illustrates an example of an operation screen on which the end time of the exceptional mode may be selected from among a plurality of preset options to determine the period of the exceptional operation.

FIG. 17 illustrates an example of an operation screen on which the end time of the exceptional mode may be selected from among a plurality of preset options to determine the period of the exceptional operation. Referring to FIG. 17, the general user selects an option to continue the exceptional mode until 12:00 on Monday.

Figure 18:
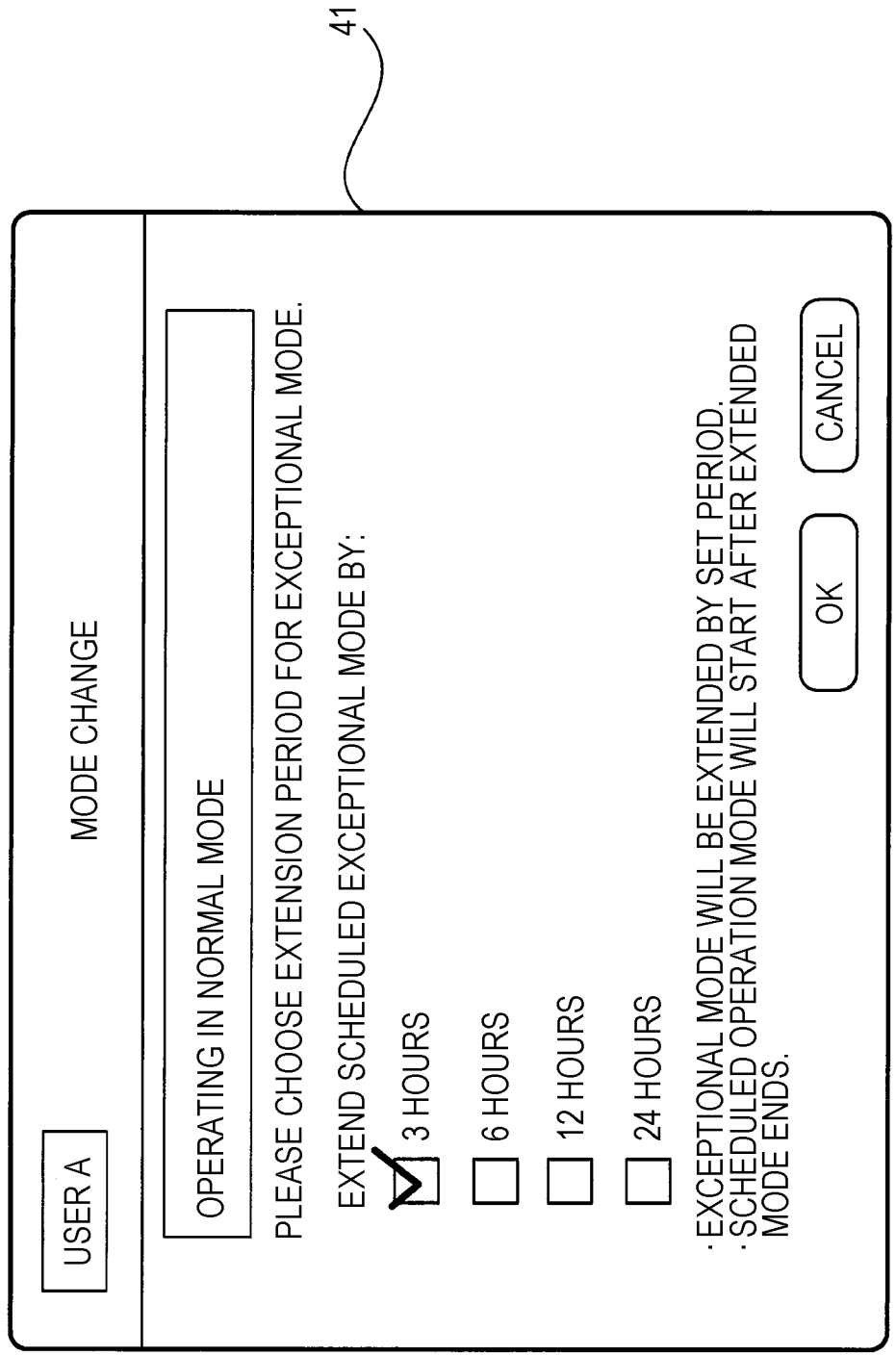
FIG. 18 illustrates an example of an operation screen on which an extension period for the exceptional mode may be selected from among a plurality of preset options to determine the period of the exceptional operation.

FIG. 18 illustrates an example of an operation screen on which an extension period for the exceptional mode may be selected from among a plurality of preset options to determine the period of the exceptional operation. Referring to FIG. 18, the general user selects an option to extend the scheduled exceptional mode by three hours.

Figure 19:
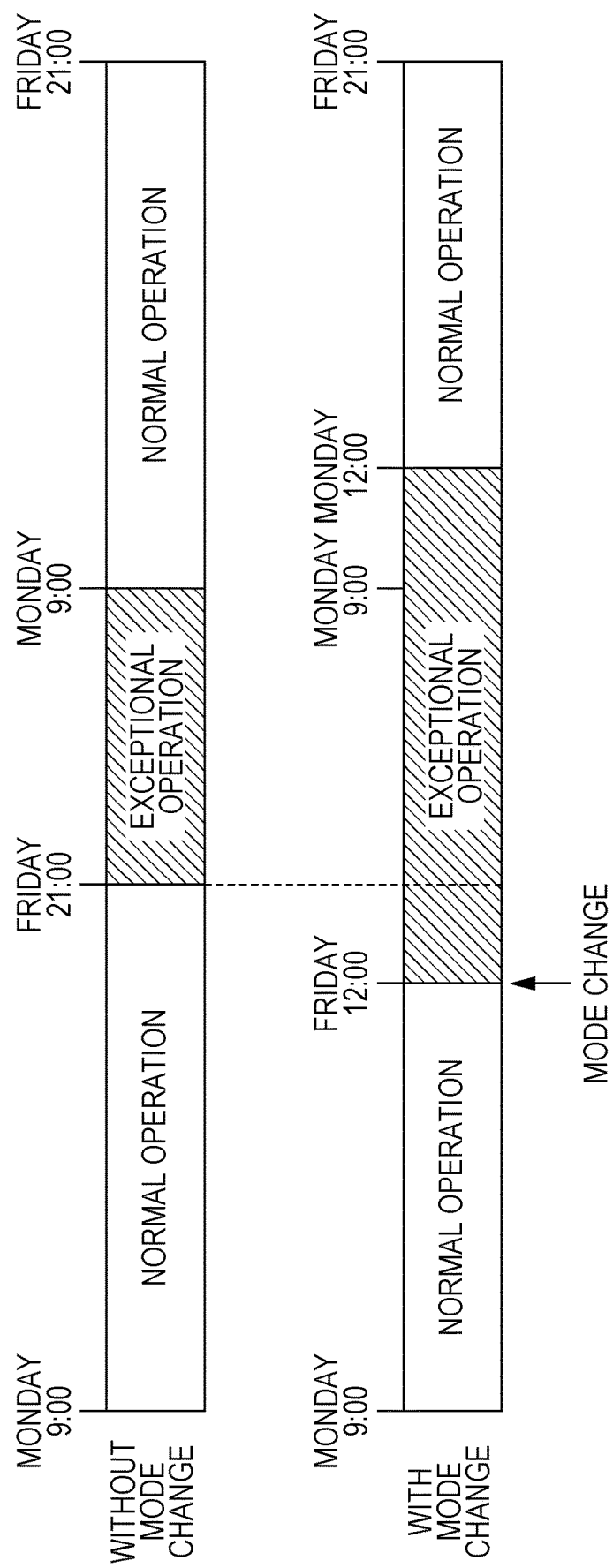
FIG. 19 illustrates an example of the operation after the mode is changed on the operation screen as illustrated in FIG. 16 to FIG. 18.

FIG. 19 illustrates an example of transition of the operation after the mode is changed on the operation screen as illustrated in FIG. 16 to FIG. 18.

In the example of the transition of the operation in FIG. 19, the operation mode is manually changed at 12:00 on Friday, and the end time of the exceptional mode is set to 12:00 on Monday or the scheduled exceptional mode is extended by three hours.

Through the operation mode change described above, settings may be made, for example, at 12:00 on Friday so that the exceptional mode continues until 12:00 on Monday under the assumption that public transportation may be delayed on Monday morning.

If the first general user manually changes the operation mode as described above but the second general user changes the operation mode again, the resultant operation mode is not intended for the first general user and a problem may occur.

For example, the user A wants to view a fax document at an outside place and therefore changes the operation mode to the exceptional mode in a time frame during which the image forming apparatus 10 is scheduled to operate in the normal operation. However, a user B changes the exceptional mode to the normal mode. In this case, fax data is not transferred to the server. As a result, the user A fails to view the fax document at the outside place.

To address this problem, when the user B logs into the image forming apparatus 10 to change the operation mode, information indicating that the exceptional mode has manually been selected may be displayed to prohibit the user B from changing the operation mode. In this case, only the administrative user or the user A may change the operation mode.

When the exceptional mode continues in this situation, other uses are never allowed to change the operation mode. Therefore, the users other than the administrative user and the user A may be allowed to change the operation mode after the scheduled timing to change the exceptional mode to the normal mode.

Figure 20:
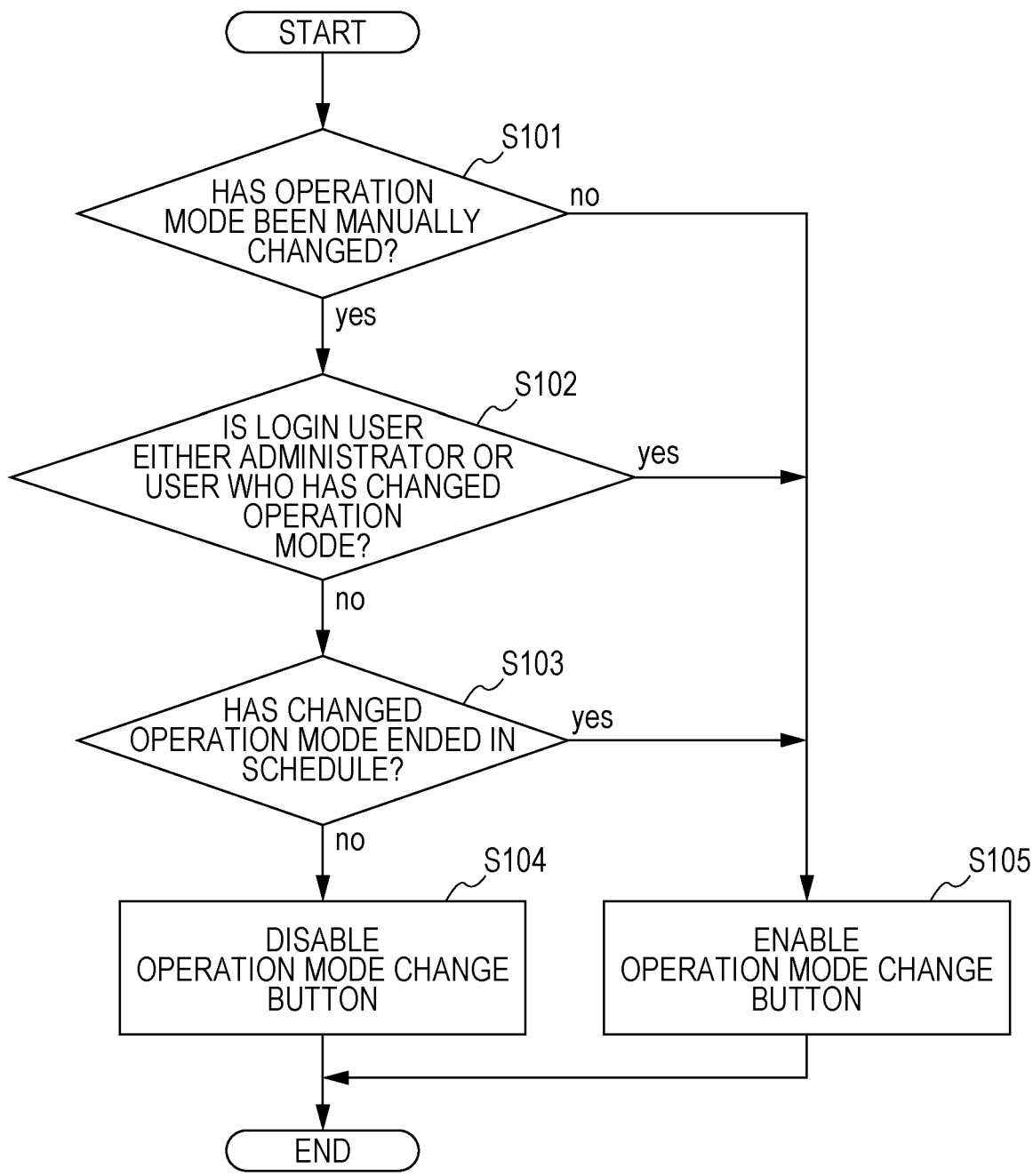
FIG. 20 is a flowchart for illustrating a process to be performed in response to selection of a mode change icon under a condition that the operation mode change is disabled for a user other than the user who has changed the operation mode.

A process to be performed in response to selection of the mode change icon 51 in the control described above is described with reference to a flowchart of FIG. 20.

In response to the selection of the mode change icon 51, the controller 35 determines, in Step S101, whether the operation mode has manually been changed.

If the controller 35 determines, in Step S101, that the operation mode has not manually been changed, the controller 35 enables the operation mode change button 52 in Step S105.

If the controller 35 determines, in Step S101, that the operation mode has manually been changed, the controller 35 determines, in Step S102, whether a user currently operating the image forming apparatus 10, that is, a login user is an administrative user or a user who has changed the mode.

If the controller 35 determines, in Step S102, that the login user is the administrative user or the user who has changed the mode, the controller 35 enables the operation mode change button 52 in Step S105.

If the controller 35 determines, in Step S102, that the login user is neither the administrative user nor the user who has changed the mode, the controller 35 determines, in Step S103, whether the changed operation mode such as the exceptional mode has ended in the schedule based on a current time and the schedule.

If the controller 35 determines, in Step S103, that the exceptional mode has ended at the current time in the schedule, the controller 35 enables the operation mode change button 52 in Step S105.

If the controller 35 determines, in Step S103, that the exceptional mode has not ended at the current time in the schedule, the controller 35 disables the operation mode change button 52 in Step S104.

Figure 21:
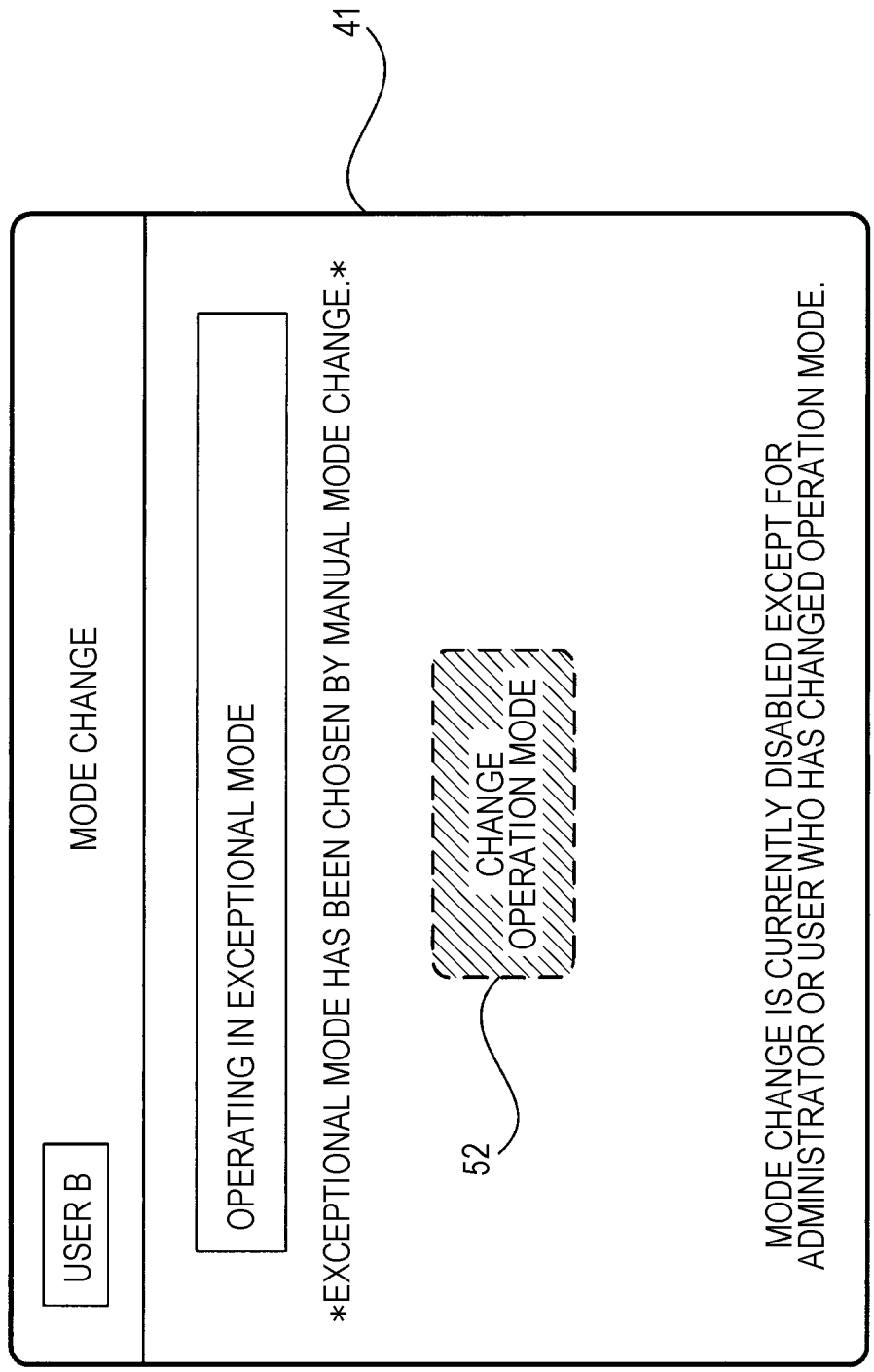
FIG. 21 illustrates an example of a display screen when a second general user different from the first general user who has changed the operation mode logs in to select the mode change icon.

FIG. 21 illustrates an example of an operation screen when the operation mode change button 52 is disabled.

FIG. 21 illustrates an example of a display screen when the user B different from the user A who has changed the operation mode logs in to select the mode change icon 51.

Referring to FIG. 21, a message "Exceptional mode has been chosen by manual mode change." is displayed and the operation mode has manually been changed by the user A. Referring to FIG. 21, the operation mode change button 52 is disabled by being grayed out. Therefore, the operation mode is not changed even if the user B tries to operate the operation mode change button 52.

If the user B logs in and the current time has passed 9:00 on Monday when the exceptional mode is scheduled to be changed to the normal mode, the operation mode change button 52 is enabled. That is, if the user B logs in, the operation mode change button 52 is disabled before 9:00 on Monday but is enabled after 9:00 on Monday as illustrated in FIG. 22.

This exemplary embodiment is directed to the operations in the case where the normal mode is manually changed to the exceptional mode, but similar operations are performed in a case where the exceptional mode is manually changed to the normal mode.

In the embodiment above, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

Modified Example

The exemplary embodiment described above is directed to the case where the operation mode of the image forming apparatus is changed depending on time frames. An operation mode of an information processing apparatus other than the image forming apparatus may also be changed depending on time frames.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory; and
a processor configured to
change an operation mode between a first operation mode and a second operation mode depending on preset time frames, set the time frames in response to an operation performed via a network by an administrative user having administration authority, and change a current operation mode to the first operation mode or the second operation mode in response to an operation input by a general user on an operation panel of the information processing apparatus, wherein, if a current operation mode differs from an operation mode to be changed depending on the preset time frames, the processor displays, on the operation panel, information indicating that the information processing apparatus is operating in an operation mode changed in response to an operation input on the operation panel.

2. An information processing apparatus comprising:
a memory; and
a processor configured to change an operation mode between a first operation mode and a second operation mode depending on preset time frames, set the time frames in response to an operation performed via a network by an administrative user having administration authority, and change a current operation mode to the first operation mode or the second operation mode in response to an operation input by a general user on an operation panel of the information processing apparatus, wherein, if the first operation mode has been changed to the second operation mode in response to an operation input by the general user on the operation panel, the processor continues the second operation mode irrespective of a timing to change the second operation mode to the first operation mode depending on the preset time frames.

3. The information processing apparatus according to claim 1, wherein, if the first operation mode has been changed to the second operation mode in response to an operation input by the general user on the operation panel, the processor performs operations in the first operation mode and the second operation mode in parallel at a timing to change the second operation mode to the first operation mode depending on the preset time frames.

4. An information processing apparatus comprising:
a memory; and
a processor configured to change an operation mode between a first operation mode and a second operation mode depending on preset time frames, set the time frames in response to an operation performed via a network by an administrative user having administration authority, and change a current operation mode to the first operation mode or the second operation mode in response to an operation input by a general user on an operation panel of the information processing apparatus, wherein the processor receives, in response to an operation input by the general user on the operation panel of the information processing apparatus, a period during which or a time until which the first operation mode or the second operation mode to be changed from the current operation mode is expected to continue, and continues the first operation mode or the second operation mode until the received period elapses or the received time is reached.

5. An information processing apparatus comprising:
a memory; and
a processor configured to change an operation mode between a first operation mode and a second operation mode depending on preset time frames, set the time frames in response to an operation performed via a network by an administrative user having administration authority, and change a current operation mode to the first operation mode or the second operation mode in response to an operation input by a general user on an operation panel of the information processing apparatus, wherein the first operation mode is a normal mode in which the information processing apparatus operates during a majority of an operating period of the information processing apparatus, and wherein the second operation mode is an exceptional mode in which the information processing apparatus performs an operation different from the operation in the first operation mode, and wherein the processor accepts the general user to input, via the operation panel, only an operation of changing the normal mode to the exceptional mode.

6. The information processing apparatus according to claim 2, wherein the processor sends information about the continuation of the second operation mode to the general user who has changed the operation mode and/or the administrative user at a timing earlier by a preset period than the timing to change the second operation mode to the first operation mode depending on the preset time frames.

7. The information processing apparatus according to claim 1, wherein, if the first operation mode has been changed to the second operation mode in response to an operation input by a first general user on the operation panel, the processor rejects an operation of changing the operation mode by a second general user.

8. The information processing apparatus according to claim 7, wherein, if the first operation mode has been changed to the second operation mode in response to the operation input by the first general user on the operation panel, the processor accepts the first general user or the administrative user to input a further operation to change the operation mode.

9. The information processing apparatus according to claim 7, wherein, if the first operation mode has been changed to the second operation mode in response to the operation input by the first general user on the operation panel, the processor accepts the second general user to input the operation of changing the operation mode after a timing to change the second operation mode to the first operation mode depending on the preset time frames.

10. A non-transitory computer readable medium storing a program causing an information processing apparatus having a processor to execute a process comprising:

changing an operation mode between a first operation mode and a second operation mode depending on preset time frames;

setting the time frames in response to an operation performed via a network by an administrative user having administration authority; and changing a current operation mode to the first operation mode or the second operation mode in response to an operation input by a general user on an operation panel, wherein, if a current operation mode differs from an operation mode to be changed depending on the preset time frames, the processor executes control to display, on the operation panel, information indicating that the information processing apparatus is operating in an operation mode changed in response to an operation input on the operation panel.

\* \* \* \* \*